United States Patent
Meurer et al.

(10) Patent No.: US 9,052,389 B2
(45) Date of Patent: Jun. 9, 2015

(54) METHOD AND RECEIVER FOR RECEIVING AND PROCESSING ALTBOC-MODULATED SATELLITE NAVIGATION SIGNALS

(75) Inventors: Michael Meurer, Gilching (DE); Manuel Cuntz, Dachau (DE)

(73) Assignee: Deutsches Zentrum Fur Luft-Und Raumfahrt E.V., Cologne (DE)

( * ) Notice: Subject to any disclaimer, the term of this patent is extended or adjusted under 35 U.S.C. 154(b) by 650 days.

(21) Appl. No.: 13/322,099

(22) PCT Filed: May 25, 2010

(86) PCT No.: PCT/EP2010/057179
§ 371 (c)(1),
(2), (4) Date: Dec. 21, 2011

(87) PCT Pub. No.: WO2010/136462
PCT Pub. Date: Dec. 2, 2010

(65) Prior Publication Data
US 2012/0092212 A1 Apr. 19, 2012

(30) Foreign Application Priority Data

May 26, 2009 (DE) .......................... 10 2009 022 729

(51) Int. Cl.
*G01S 19/23* (2010.01)
*G01S 19/33* (2010.01)
*G01S 19/36* (2010.01)

(52) U.S. Cl.
CPC .................. *G01S 19/23* (2013.01); *G01S 19/33* (2013.01); *G01S 19/36* (2013.01)

(58) Field of Classification Search
CPC ....... G01S 19/32; G01S 19/33; G01S 5/0205; G01S 19/24; G01S 19/36
USPC ............. 342/357.34, 357.39, 357.69, 357.72, 342/357.76, 357.77
See application file for complete search history.

(56) References Cited

U.S. PATENT DOCUMENTS

| | | | |
|---|---|---|---|
| 5,535,278 A * | 7/1996 | Cahn et al. .................... | 380/274 |
| 5,949,372 A * | 9/1999 | Lennen .................... | 342/357.62 |
| 7,486,717 B2 * | 2/2009 | De Wilde et al. ............. | 375/150 |

(Continued)

OTHER PUBLICATIONS

Sleewaegen, Jean-Marie et al., "Galileo AltBOC Receiver," XP-002598050, pp. 1-9.

*Primary Examiner* — John B Sotomayor
*Assistant Examiner* — Marcus Windrich
(74) *Attorney, Agent, or Firm* — Craig Metcalf; Kirton McConkie

(57) ABSTRACT

AltBOC-modulated satellite navigation signals transmitted in the two partial bands E5$a$ and E5$b$ of the so-called E5 frequency band are received using a common antenna (19) and thereafter are processed separately in an analog manner in the HF front-end in two physically different incoming signal paths for the two partial bands and then digitized and coherently summed to form a complete digital E5 band signal, which is fed to a digital signal processor, in which code acquisition and code tracking are performed using PRN reference code sequences produced in the receiver and tracking of the carrier phase is performed and raw data for the final navigation calculation are determined therefrom. From the PRN reference code sequences produced in the receiver, a PRN code calibration signal is produced, which is up-converted to the carrier frequency and then coupled into the HF front-end as a pseudo satellite navigation signal by means of a directional coupler (20) directly after the antenna, which pseudo satellite navigation signal is also tracked in the digital signal processor as an addition signal, which makes it possible to calibrate the HF front-end for the two partial bands during the normal satellite navigation signal reception.

For application with Galileo satellite navigation receivers.

5 Claims, 3 Drawing Sheets

(56) References Cited

U.S. PATENT DOCUMENTS

| | | | |
|---|---|---|---|
| 2005/0012664 A1* | 1/2005 | Gerein | 342/361 |
| 2009/0219201 A1* | 9/2009 | Martin et al. | 342/357.12 |
| 2010/0254439 A1* | 10/2010 | Martin | 375/150 |
| 2013/0021934 A1* | 1/2013 | Rugamer et al. | 370/252 |

* cited by examiner

METHOD AND RECEIVER FOR RECEIVING AND PROCESSING ALTBOC-MODULATED SATELLITE NAVIGATION SIGNALS

This application is a National Stage of International Application No. PCT/EP2010/057179, filed May 25, 2010, and entitled METHOD AND RECEIVER FOR RECEIVING AND PROCESSING ALTBOC-MODULATED SATELLITE NAVIGATION SIGNALS, which claims the benefit of DE 10 2009 022 729.6, filed May 26, 2009. This application claims priority to and incorporates herein by reference the above-referenced applications in their entirety.

BACKGROUND

The invention refers to a method for receiving and processing AltBOC-modulated satellite navigation signals transmitted in the two partial bands E5a and E5b of the so-called E5 frequency band are received using a common antenna and thereafter are processed separately in an analog manner in the HF front-end in two physically different incoming signal paths, each performing a down conversion, for the partial bands E5a and E5b and then digitized using analog-to-digital conversion and coherently summed to form a complete digital E5 band signal, which is fed to a digital signal processor, in which code acquisition and code tracking are performed using PRN reference code sequences produced in the receiver and tracking of the carrier phase is performed and raw data for the final navigation calculation are determined therefrom.

The invention further refers to a satellite navigation receiver for carrying out the method.

It is known that receivers implemented in global satellite navigation systems (GNSSs), such as GPS (Global Positioning System), for instance, determine their position on the basis of received signals emitted from satellites that are a part of a global satellite constellation, e.g. GPS satellites. The satellites that belong to the GPS satellite constellation emit their signals at two carrier frequencies L1 and L2, wherein the carrier L1 has a frequency of 1575.42 MHz and the carrier L2 has a frequency of 1227.60 MHz.

Each carrier is modulated with at least one pseudorandom binary code sequence PRN (pseudorandom noise) that is formed by a seemingly random, periodically repeating sequence of zeroes and ones. The PRN sequences are referred to as ranging codes since they allow an estimation of the distances ("ranges") between a receiver and a satellite. Each satellite uses a PRN code sequence of its own, whereby the receiver can associate the received signal to the satellite that has transmitted the same. The receiver calculates the difference between the moment at which the satellite has emitted the signal, which information is included in the signal itself, and the moment at which the receiver itself has received the signal.

Based on the temporal difference, the receiver calculates its own distance (pseudorange) from the satellite. The receiver can calculate its own global position from the determined distances to at least four satellites. For the purpose of determining the temporal difference between the above-mentioned transmission time and the above-mentioned receiving time of the signal, the receiver synchronizes a locally generated PRN reference code sequence with the PRN code sequence included in the received signal.

In this manner, the receiver determines the amount of time deviation of the locally generated PRN reference code sequence with respect to the satellite time and calculates the distance. The synchronization operations comprise acquiring the PRN code sequence of the satellite and the tracking thereof (code tracking). In addition, the receiver usually tracks the phase of the carrier that is used by the satellite to transmit the PRN code sequences and the navigation data (phase tracking).

At present, a new satellite navigation system by the name of Galileo is realized which provides a very high precision and various services. It operates in the principal frequency ranges, namely L1 (1559-1591 MHz), E6 (1260-1300 MHz) and E5 (1164-1214 MHz). The so-called E5 band comprises, on the one hand, a plurality of partial signals that use only a respective one of two partial bands E5a (1164-1191 MHz) or E5b (1191-1214 MHz) and, on the other hand, a signal that uses the full E5 bandwidth. FIG. 1 illustrates the Galileo frequency spectrum in detail.

Details of the Galileo system and related receiving methods as well as of the receivers are described for example in the essay by M. Hollreiser: "Galileo Receivers—Challenges and Performance", 12th GAAS Symposium, Amsterdam, 2004, pp. 515-518, and in EP 2 012 488 B1.

As far as the E5 band signal is concerned in particular, the satellites of the new Galileo satellite navigation system transmit the signals in the partial band E5a (centre frequency 1176.45 MHz) and in the partial band E5b (centre frequency 1207.14 MHz) in the form of a composite signal with a centre frequency of 1191.795 MHz using a modulation format generally known by the name AltBOC (Alternate Binary Offset Carrier).

The large bandwidth of the E5 signal of about 52 MHz does indeed allow a very precise localizing, however, it places high demands on the development of receivers. Due to the large bandwidth a very great effort in digital signal processing arises. Moreover, the large receiving bandwidth increases the susceptibility of the receiver to faults. Therefore, one strives to process the two partial bands E5a and E5b separately. This means that the two partial bands E5a and E5b are processed by two physically different signal paths.

However, due to this separate processing of the two partial bands, valuable information about the relation between the two signals is lost. From the article by N. Martin, H. Guichon, M. Revol, M. Hollreiser, J. De Maestro: "Architecture of the GAII LEO TUS receiver for coherent AltBOC tracking", 3,d CNES-ESA Workshop on GNSS Signals and Signal Processing, 21&22 Apr. 2008, IAS (INSTITUT AERO SPATIAL), Toulouse, France, a technology for solving this problem is known, wherein the separately received Galileo E5a and E5b partial band signals are used to correct the different characteristics of the two HF-front end signal paths on the digital level.

Here, a coherent AltBOC processing is realized on the same hardware demodulation architecture as used for the independent processing, however, with a coherent summing of the two components on a digital software level. The disadvantage of this known method is, however, that the received Galileo signals in the partial band E5a and E5b are disturbed by a variety of influences, such as, for example, multi path propagation, ionosphere errors and interferences. These influences are highly frequency-selective and can significantly compromise the calibration.

FIG. 2 illustrates a block diagram of a Galileo signal receiver operating according to this known method in the frequency band E5. The satellite navigation signals received through an antenna 1 are first amplified in a low-noise pre-amplifier (LNA) 2 and are then divided by means of two band filters 3 and 4 onto the partial band E5a/L5 and the partial band E5b into two independent physically separate incoming signal paths. In each of the two incoming signal paths, the filtered signals are then amplified in a HF amplifier 5 and 6, respectively, and are thereafter, while being filtered by a polyphase filter 10, converted to the intermediate frequency range by means of a down-converter 7 and 8, respectively, operated via a local reference oscillator 9.

The received signals converted to the intermediate frequency range are then amplified in each of the two incoming signal paths by means of an intermediate frequency amplifier 12 and 13, respectively, and are thereafter supplied to a VGA amplifier 14 and 15, respectively, with variable gain that is set by a digital signal processor through an AGe control loop, which digital signal processor could be configured as a FPGA (Field Programmable Gate Array) A/D board 16 and also includes the analog-to-digital converters for the digitization of the two analog received signals. In the FPGA A/D board 16, a coherent summing of the two digitized signals is performed on the digital level.

The digital signal processor comprises means for acquiring codes and for tracking codes using a PRN reference code sequence generator provided in the receiver, as well as a means for tracking the carrier phase. The raw data determined in the digital signal processor are supplied to a means for final navigation calculation. The IF received signal amplified in the VGA amplifier 14 and 15, respectively, is further passed through an anti-aliasing filter 17 and 18, respectively, in each incoming signal path, before it is subjected to analog-to-digital conversion in the FPGA A/D board 16.

BRIEF SUMMARY

It is an object of the present invention to provide a method for receiving and processing AltBOC-modulated satellite navigation signals transmitted on the two partial bands E5a and E5b of the E5 frequency band, wherein the received E5a and E5b signals can be processed in two analog incoming signal paths and a coherent summing of the two digitized signals is possible, while, in the event of strongly frequency-selective influences, a perfect and insusceptible calibration of the E5a-E5b HF front end can still be obtained during operation. In addition, the invention provides an advantageous and suitable receiver for practicing such a method.

According to the invention which refers to a method for receiving and processing AltBOC-modulated satellite navigation signals of the above-mentioned type, this object is achieved by using the PRN reference code sequences generated in the receiver to generate a PRN code calibration signal that is up-converted to the carrier frequency by means of an up-converter and is then coupled into the HF front end directly behind the antenna by a directional coupler as a pseudo satellite navigation signal that is also tracked in the digital signal processor as an additional signal, whereby it is possible to calibrate the HF front end for the partial bands E5a and E5b during the normal reception of satellite navigation signals.

According to the method of the present invention the PRN reference code sequences generated in the receiver are then used to generate an additional Galileo satellite navigation signal. This additional satellite navigation signal is converted to the corresponding carrier frequency by an up-converter and is then coupled into the HF front end directly behind the antenna by a directional coupler. By using the existing channels in the tracking module of the receiver, the calibration signal can be "tracked along" continuously as an additional Galileo satellite.

This allows for a calibration of the E5a and E5b HF front end during the normal process of receiving Galileo satellite navigation signals. Due to the generation of these pseudo Galileo navigation satellite signals, the calibration is insusceptible to the different and frequency-dependent propagation characteristics (in particular multipath propagation, ionosphere errors and interferences) of the really received Galileo navigation satellite signals.

The method, implemented according to the invention and including calibration, thus makes it possible to coherently recombine the two partial bands E5a and E5b to the complete E5 band on the digital level and to use the AltBOC modulated signal despite separate analog signal processing.

In an advantageous manner, both the down-conversion in the two analog incoming signal paths and the up-conversion of the PRN code calibration signal are performed using a common local reference oscillator.

A satellite navigation signal receiver achieving the object which is configured to receive and process AltBOC-modulated satellite navigation signals transmitted in the two partial bands E5a and E5b of the so-called E5 frequency band using a common antenna and an adjoining HF front-end with two physically different, independent incoming signal paths, each provided with a down-converter, for a separate analog processing in the partial band E5a and E5b and an adjoining analog-to-digital converter with a subsequent means for a coherent summing to form a complete digital E5 band signal that is supplied to a digital signal processor in which code acquisition and code tracking means using PRN reference code sequences provided in the receiver and carrier phase tracking means are provided, and whose raw data determined therefrom are supplied to a means for the final navigation calculation, is characterized in that a PRN code calibration signal produced in the PRN reference code sequence generator of the digital signal processor is supplied to an up-converter up-converting to the carrier frequency, and that this up-converted PRN code calibration signal is supplied to a directional coupler which is arranged directly behind the antenna in the HF front end and couples the up-converted PRN code calibration signal into the same as a pseudo satellite navigation signal which is also tracked in the digital signal processor as an additional signal, which makes it possible to calibrate the HF front-end for the partial bands E5a and E5b during the normal satellite navigation signal reception.

With such a receiver, it is feasible that both the down-converters in the two analog incoming signal paths and the up-converter for the PRN code calibration signal are operated by means of a common local reference oscillator.

The analog-to-digital converters and the digital signal processor with the PRN code sequence generator are advantageously implemented as a FPGA AD board into which the means for the final navigation calculation can be included as well.

The method of the present invention can advantageously playa decisive role in the field of receiver development for safety-critical and military applications. Likewise, monitor and control stations can benefit much from using this new technical method.

Advantageous and suitable developments and embodiments of the satellite navigation receiver and the associated method according to the present invention are defined in the dependent claims referring to the independent claims.

BRIEF DESCRIPTION OF THE DRAWINGS

The invention is hereinafter explained in detail with respect to drawings. In the Figures.

DETAILED DESCRIPTION

Figure 1:
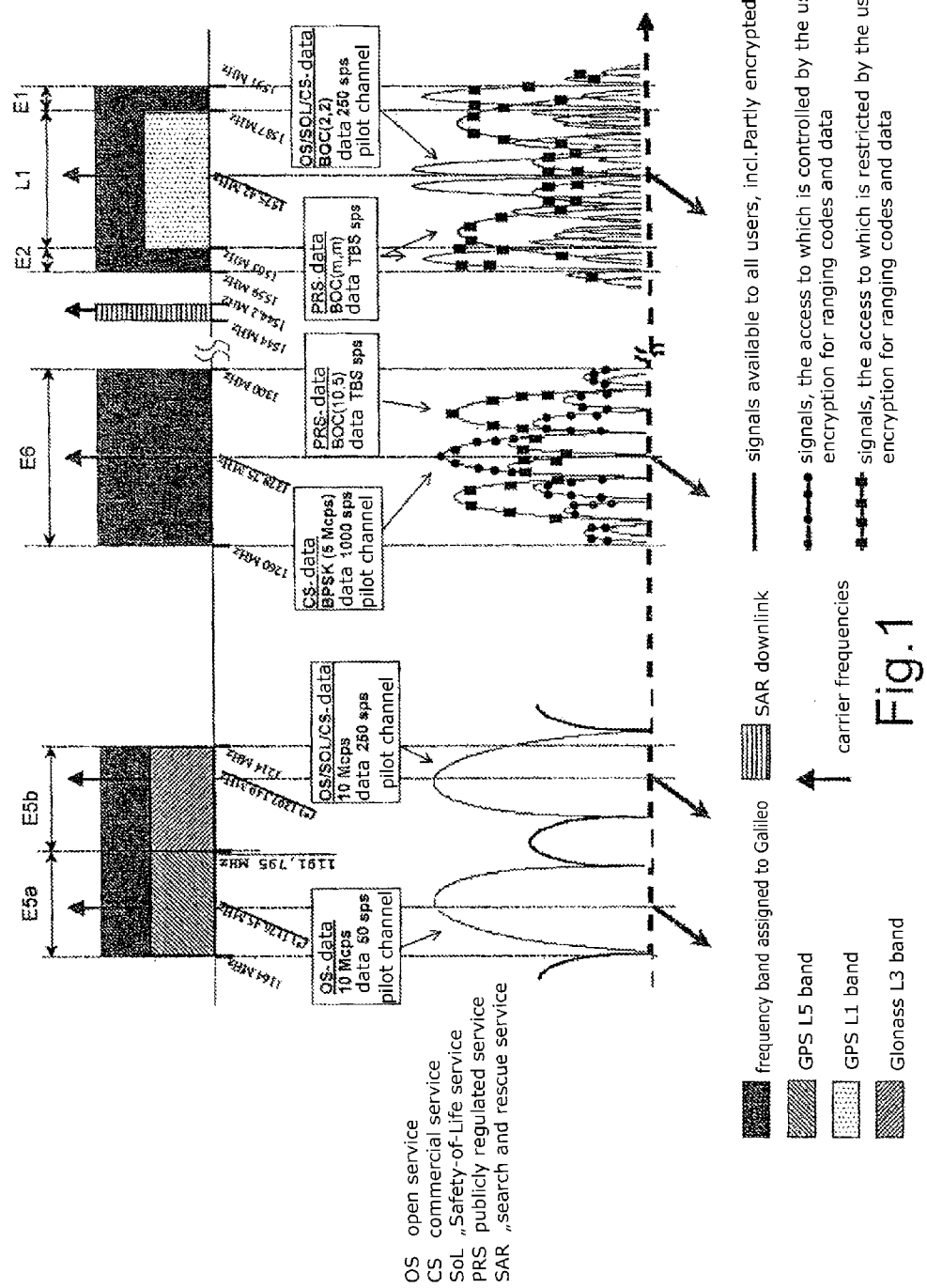
FIG. 1 is a diagram already explained above, illustrating the specified frequency range for the Galileo satellite navigation system.
Figure 2:
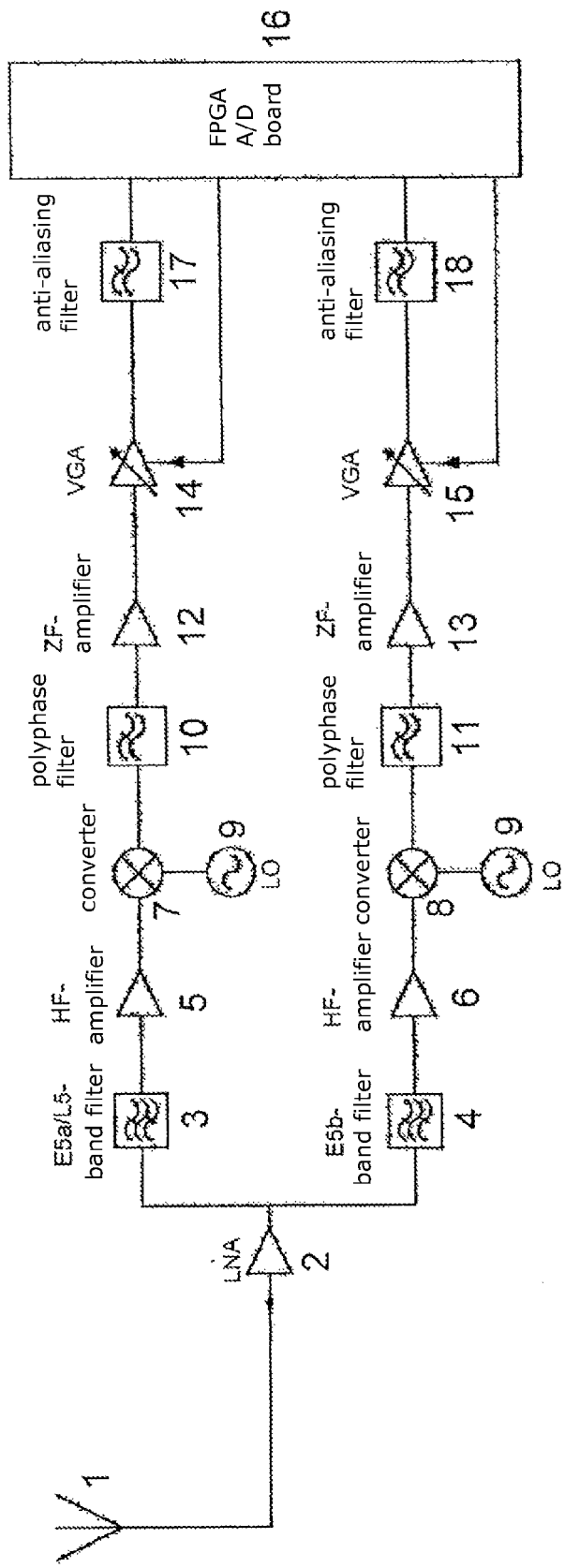
FIG. 2 is the block diagram already explained above, illustrating a known Galileo satellite navigation receiver for the frequency band E5 formed by the two partial bands E5a and E5b.
Figure 3:
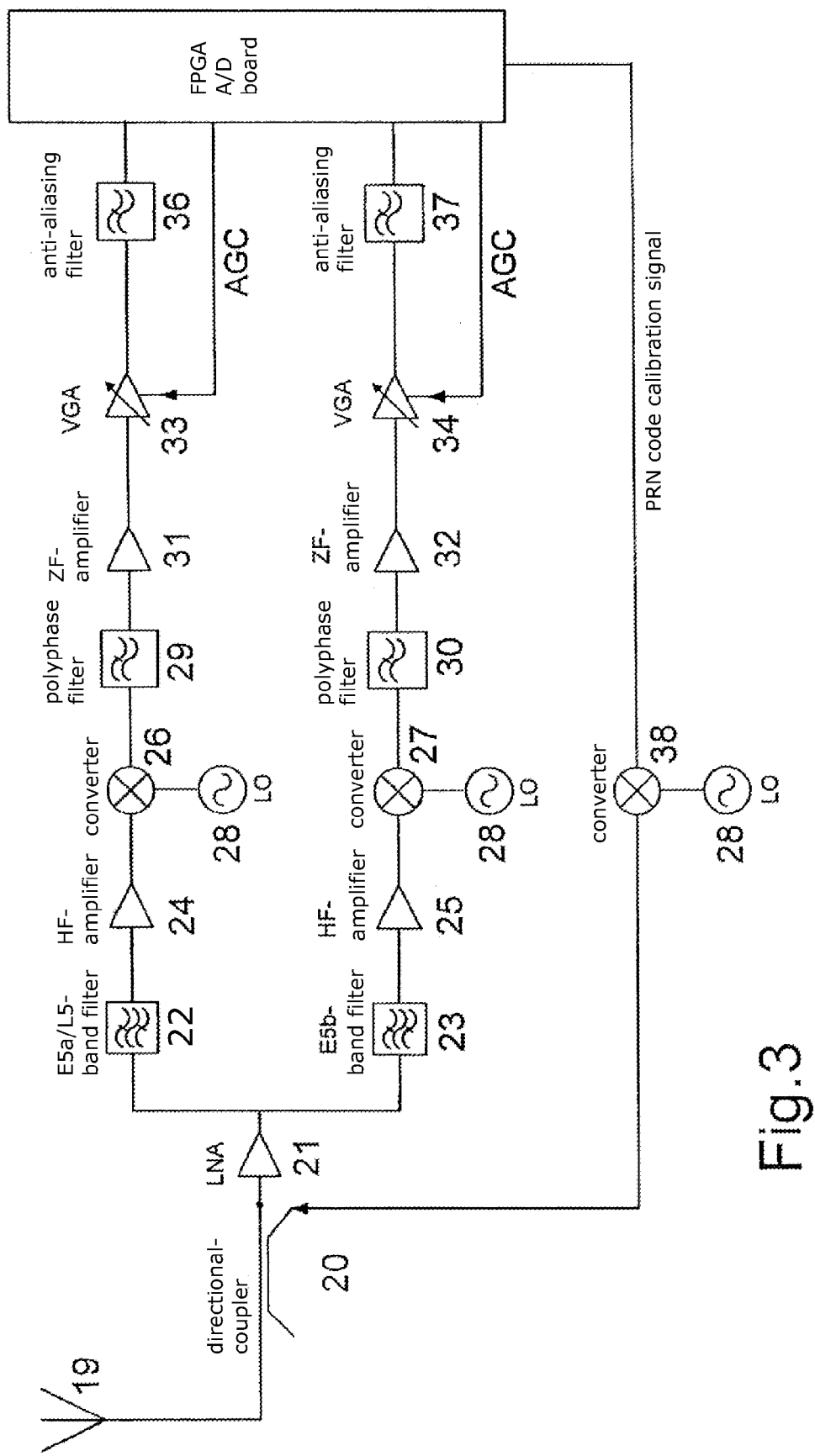
FIG. 3 illustrates a block diagram of a Galileo satellite navigation receiver for the frequency band E5 formed by the two partial bands E5a and E5b with advantageous calibration possibility, the receiver being embodied according to the invention.

FIG. 3 illustrates a block diagram of a receiver operating according to the present invention, the receiver being intended for receiving Galileo signals in the frequency band E5. After having been passed through a directional coupler 20, whose function will be explained in detail hereunder, the satellite navigation signals received via an antenna 19 is first amplified in a low-noise pre-amplifier (LNA) 21 and is then divided by means of two band filters 22 and 23 onto the partial band E5a/L5 and the partial band E5b and into two independent physically separated incoming signal paths.

In each of the two incoming signal paths, the filtered signals are then amplified in a HF amplifier 24 and 25, respectively, and are thereafter, while being filtered by a polyphase filter 29 and 30, respectively, converted to the intermediate frequency range by means of a down-converter 26 and 27, respectively, operated through a local reference oscillator 28. The received signals converted to the intermediate frequency range are then amplified in each of the two incoming signal paths by means of an intermediate frequency amplifier 31 and 32, respectively, and are thereafter supplied to a VGA amplifier 33 and 34, respectively, with variable gain that is set by a digital signal processor through an AGe control loop, which digital signal processor could be configured as a FPGA (Field Programmable Gate Array) A/D board 35 and may also include the analog-to-digital converters.

In the FPGA A/D board 35, a coherent summing of the two digitized signals is performed on the digital level. The digital signal processor comprises means for acquiring codes and for tracking codes using a PRN reference code sequence generator provided in the receiver, as well as a means for tracking the carrier phase. The raw data determined in the digital signal processor are supplied to a means for final navigation calculation. The IF received signal amplified in the VGA amplifier 33 and 34, respectively, is further passed through an anti-aliasing filter 36 and 37, respectively, in each incoming signal path, before it is subjected to analog-to-digital conversion in the FPGA A/D board 35.

The PRN reference code sequence generator included in the digital signal processor of the FPGA board 35 in the receiver is used to generate an additional Galileo satellite navigation signal. This additional satellite navigation signal is converted to the corresponding carrier frequency by an up-converter 38 that is operated by means of the local oscillator 28, and is then coupled into the HF front end directly behind the antenna 19 by a directional coupler 20. By using the existing channels in the tracking module of the receiver, the calibration signal can be "tracked along" continuously as an additional Galileo satellite. This allows for a calibration of the E5a and E5b HF front end during the normal process of receiving Galileo satellite navigation signals. Due to the generation of these pseudo Galileo navigation satellite signals, the calibration is insusceptible to the different and frequency-dependent propagation characteristics (in particular multi path propagation, ionosphere errors and interferences) of the really received Galileo navigation satellite signals.

The invention claimed is:

1. A method for receiving and processing AltBOC-modulated satellite navigation signals, the method comprising:
    generating a PRN code calibration signal based on one or more PRN reference code sequences, the PRN code calibration signal being an AltBOC-modulated signal that includes two separated partial bands;
    upconverting the PRN code calibration signal to the E5 band such that the PRN code calibration signal includes an E5a partial band and an E5b partial band;
    receiving, via a common antenna, an E5 band satellite signal comprising an AltBOC-modulated signal such that the E5 band satellite signal includes an E5a partial band signal and an E5b partial band signal;
    coupling the PRN code calibration signal with the E5 band satellite signal to produce a coupled signal;
    splitting the coupled signal into the E5a partial band and the E5b partial band such that each partial band within the coupled signal is processed through a corresponding E5a partial band high frequency front-end or an E5b partial band high frequency front-end, the processing including downconverting and digitizing each partial band to produce digitized E5a and E5b signals for each of the E5 satellite signal and the PRN code calibration signal;
    analyzing the digitized E5a and E5b signal for the PRN code calibration signal to identify, for each high frequency front-end, one or more frequency dependent propagation characteristics caused by the high frequency front-end;
    applying the corresponding one or more parameters to the digitized E5a and E5b signal for the E5 satellite signal to account for the one or more frequency dependent propagation characteristics; and
    after applying the one or more parameters, coherently summing the digitized E5a and E5b signals for the E5 satellite signal to produce a complete digital E5 signal.

2. The method of claim 1, wherein the upconverting and downconverting are performed using a common local reference oscillator.

3. A system for receiving and processing AltBOC-modulated satellite navigation signals, the system comprising:
    a logic board configured to generate a PRN code calibration signal based on one or more PRN reference code sequences, the PRN code calibration signal being an AltBOC-modulated signal that includes two separated partial bands;
    an upconverter configured to upconvert the PRN code calibration signal to the E5 band such that the PRN code calibration signal includes an E5a partial band and an E5b partial band;
    a common antenna configured to receive an E5 band satellite signal comprising an AltBOC-modulated signal such that the E5 band satellite signal includes an E5a partial band signal and an E5b partial band signal;
    a directional coupler configured to couple the PRN code calibration signal with the E5 band satellite signal to produce a coupled signal;
    first and second filters configured to filter the coupled signal into the E5a partial band and the E5b partial band;
    an E5a partial band high frequency front-end configured to downconvert and digitize the E5a partial band to produce a digitized E5a signal for each of the E5 satellite signal and the PRN code calibration signal;
    an E5b partial band high frequency front-end configured to downconvert and digitize the E5b partial band to produce a digitized E5b signal for each of the E5 satellite signal and the PRN code calibration signal;

wherein the logic board is further configured to:

analyze the digitized E5a and E5b signal for the PRN code calibration signal to identify, for each high frequency front-end, one or more frequency dependent propagation characteristics caused by the high frequency front-end;

apply the corresponding one or more parameters to the digitized E5a and E5b signal for the E5 satellite signal to account for the one or more frequency dependent propagation characteristics; and after applying the one or more parameters, coherently sum the digitized E5a and E5b signals for the E5 satellite signal to produce a complete digital E5 signal.

4. The system of claim 3, further comprising a common local reference oscillator for performing the upconversion and downconversion.

5. The system of claim 3, further comprising a low noise amplifier configured to amplify the coupled signal.

\* \* \* \* \*